Oct. 24, 1939.  L. F. LEVY  2,176,910
PHOTOGRAPHIC APPARATUS FOR COPYING AND LIKE PURPOSES
Filed Oct. 31, 1936  2 Sheets-Sheet 1

Inventor:
Lionel F Levy
by his Attorneys
Howson & Howson

Oct. 24, 1939.  L. F. LEVY  2,176,910
PHOTOGRAPHIC APPARATUS FOR COPYING AND LIKE PURPOSES
Filed Oct. 31, 1936   2 Sheets-Sheet 2
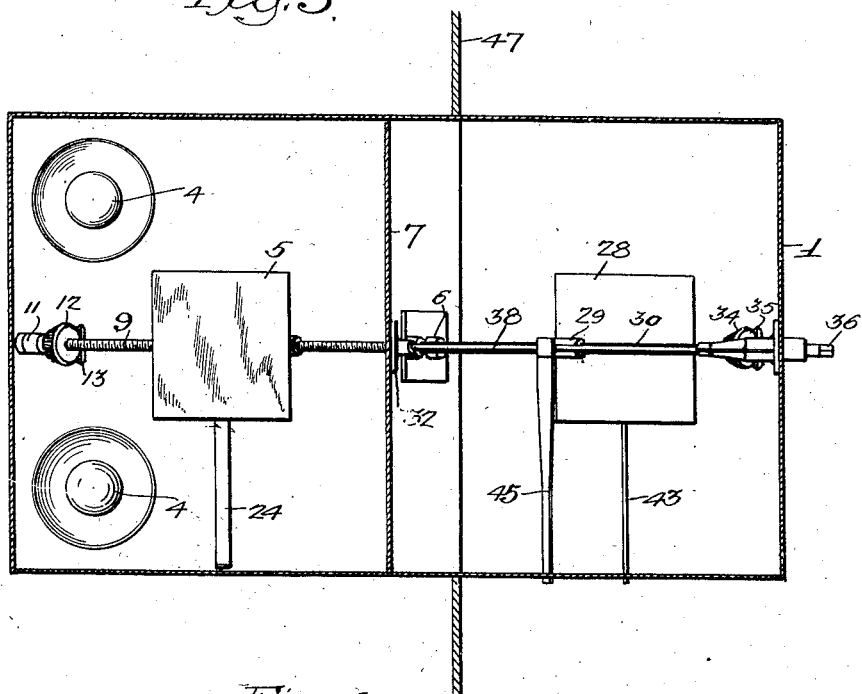
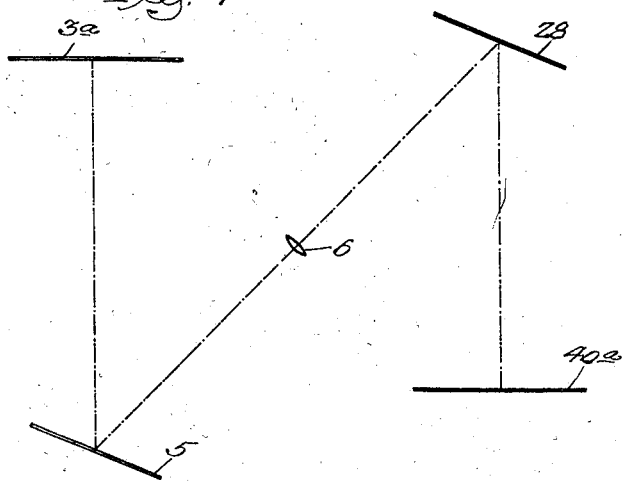

Patented Oct. 24, 1939

2,176,910

UNITED STATES PATENT OFFICE 2,176,910

PHOTOGRAPHIC APPARATUS FOR COPYING AND LIKE PURPOSES

Lionel F. Levy, Philadelphia, Pa., assignor of one-half to Howard S. Levy, Feasterville, Pa.

Application October 31, 1936, Serial No. 108,652

3 Claims. (Cl. 88—24)

This invention relates to photographic apparatus for copying purposes and for making halftone reproductions. The principal object of the invention is to provide a novel apparatus which has definite advantages over prior methods employed in photographic copy work, particularly in that the apparatus is much more convenient to use and greatly facilitates the copy process.

In the past, photo-reproductive work has generally been done by means of a copying camera adapted to move along a bridge or tracks to or from a copy-board, or the camera was fixed and the copy-board moved. This arrangement takes up considerable floor space and further, where the copy-board is movable, requires readjustment of the floor lamps, as used in practice, with each change of position of the copy-board.

In the apparatus of the present invention the copy-board or holder, the lens, and the photosensitive surface are in fixed positions and the change in length of the light paths to obtain sharp focus and the size desired in copying, is obtained by moving light-reflective surfaces or mirrors. One mirror or set of mirrors is provided between the copy and the lens, and another mirror or set of mirrors is provided between the lens and the photosensitive surface. This invention provides an apparatus whereby the focusing adjustments are obtained by the use of reflecting devices providing revertive light paths between the copy and the lens, and between the lens and the photosensitive surface, whereby the light path is made more compact and the floor space needed for photo-copying is greatly reduced. Also, since the copy and the sensitive surface are in fixed positions, the apparatus is more convenient to use. The lights for illuminating the copy may be kept in fixed position, and the sensitive surface may be placed in a very convenient horizontal position and there fixed.

Other objects and features of the invention will appear later.

In the accompanying drawings:

Fig. 3 is a sectional plan view taken along the line 3—3 of Fig. 1; and

Fig. 4 is a diagrammatic illustration showing the paths of travel of the light.

Figure 1:
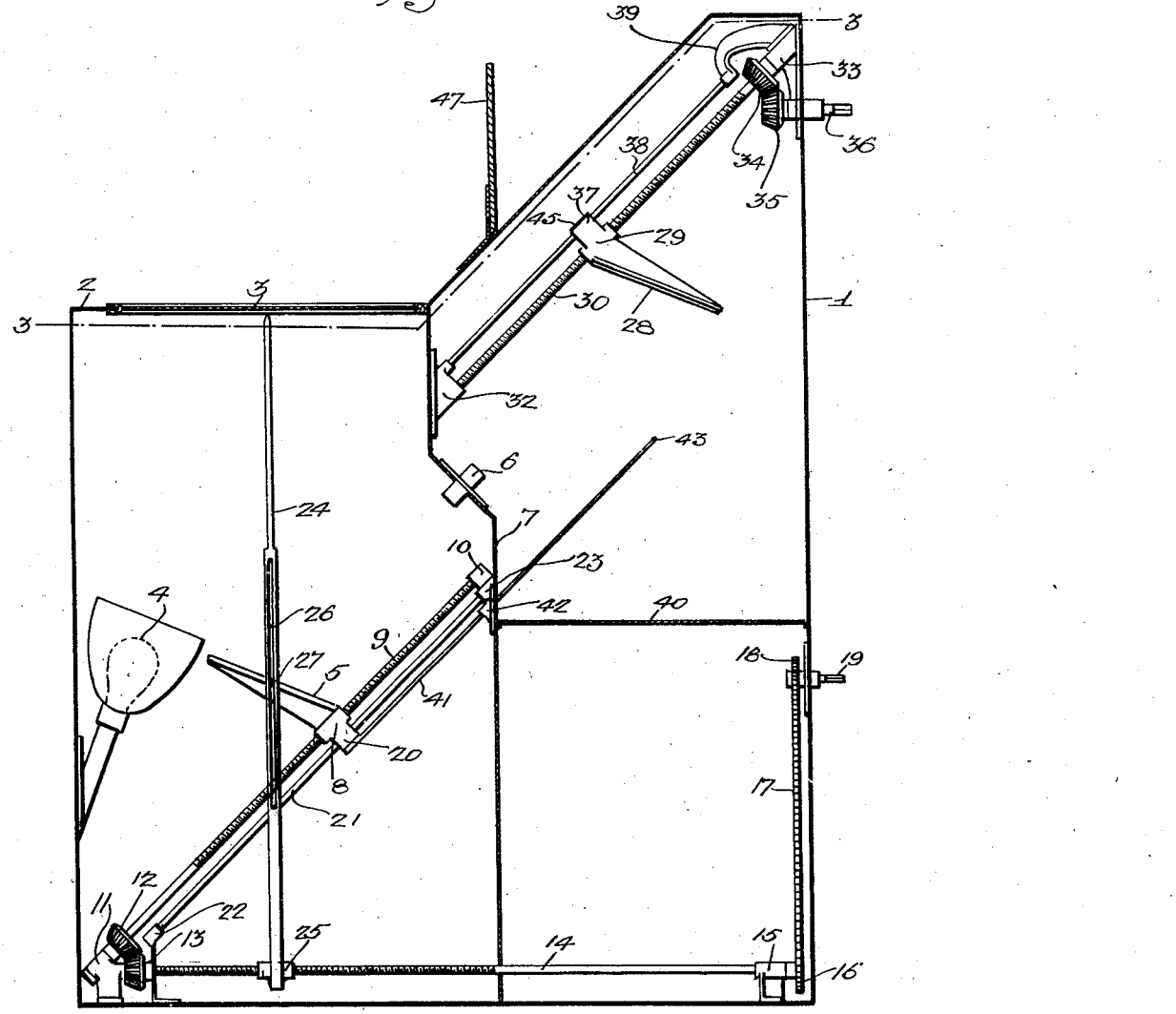
Fig. 1 is a sectional elevation of the apparatus.

Referring to Fig. 1, there is provided a housing I of the general shape illustrated. The horizontal portion 2 of the housing I is adapted to support a copy upon the transparent plate 3. A plurality of light sources 4 are arranged to project light onto the supported copy. Although any desired number of light sources may be employed, two such sources are shown in the illustrated apparatus and are arranged opposite one another as shown in Fig. 3.

A reflecting device 5 is arranged to receive light from the supported copy and reflect it onto the lens 6 which is carried upon an inclined portion of the wall 7. The reflecting device 5 is carried by a support 8 which is threadedly mounted upon the screw or threaded shaft 9. The screw 9 is inclined at an angle and extends parallel to the axis of the lens 6 and has its ends journaled respectively at 10 and 11. At its lower end, the screw 9 carries a bevel gear 12 which meshes with a similar gear 13 on the end of the horizontal shaft 14, one end of this shaft being journaled in the support 11, while the other end is journaled in the support 15. The latter end of shaft 14 carries a sprocket 16 which is connected by chain 17 to a sprocket 18 on the shaft 19. It will be seen that by turning the shaft 19, the screw 9 is turned through the medium of shaft 14. The support 8 is bifurcated at its lower end to provide extending lugs 20 disposed on opposite sides of the rod 21 which extends parallel to screw 9 and has its ends rigidly supported at 22 and 23, respectively. In this manner, the support 8 is prevented from rotating and, therefore, when the screw 9 is rotated as above mentioned, the support 8 is moved along the screw 9, thus moving the reflecting device 5 in a direction parallel to the axis of the lens 6.

In order to indicate the position of the reflecting device 5, there is provided a pointer 24, the upper pointed end of which is disposed adjacent the transparent plate 3 so as to be visible therethrough, the lower end of the pointer being attached to a sleeve 25 which is threadably mounted on the shaft 14. The intermediate portion of the pointer 24 is slotted at 26 and a pin 27 carried at the side of the reflecting device 5 rides in the slot, thus supporting the upper part of the pointer and, at the same time, permitting movement thereof as the reflecting device 5 is adjusted. In this manner, the upper pointed end of the pointer 24 indicates the point with which the center of the copy should be aligned for any particular adjustment of the reflecting device 5. It will be understood that the cooperative threads on shaft 14 and sleeve 25 are such as to cause the sleeve to move horizontally in substantial accordance with the horizontal component of the movement of the reflecting device 5.

A second reflecting device 28 is arranged to receive light from the lens 6. This reflecting device is carried upon a support 29 which is threadably mounted upon the screw 30, the screw 30 having its ends journaled at 32 and 33, respectively, and carrying a bevel gear 34 which meshes with a similar gear 35, the latter being carried upon the end of shaft 36. The support 29 is provided with lugs 37 which cooperate with rod 38 to prevent turning of the support 29, the ends of rod 38 being rigidly supported by the supports 32 and 39, respectively. Thus, by turning shaft 36, the screw 30 may be rotated, causing the reflector 28 to move similarly to the reflector 5. The reflector 28 reflects the light from lens 6 onto a photosensitive plate which may be disposed upon the support 40.

Figure 2:
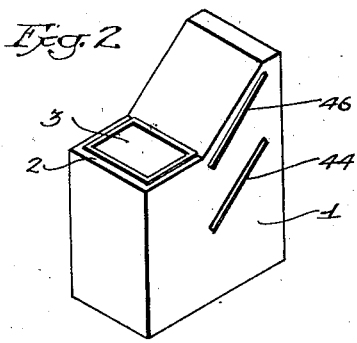
Fig. 2 is a miniature perspective view showing certain details.

The support 8 for the reflecting device 5 carries an indicator 41 which extends through a light-tight gland 42 carried by wall 7. This indicator has a transverse portion 43 (see Fig. 3) which extends through a slot 44 (see Fig. 2) in a side wall of the housing, the end of the indicator being adapted to ride in the slot as the reflecting device 5 is adjusted. Similarly, the support 29 for the reflecting device 28 carries an indicator 45 which extends transversely as shown in Fig. 3 through the slot 46 in the side wall of the housing, as shown in Fig. 2. Along or adjacent the slots 44 and 46, there may be provided stationary scales with which the indicators 41 and 45 may cooperate to thus indicate adjustments of the reflecting devices 5 and 28. The scales may be calibrated in any desired manner. For example, they may indicate different adjustment positions for different reductions or enlargements of the copy. In such case, the reflecting devices 5 and 28 may be easily positioned to provide the desired reduction or enlargement of the copy.

Preferably, the apparatus will be of substantial size and it may be built into the wall of a dark room. In Figs. 1 and 3, the wall of a dark room is shown at 47, the portion of the apparatus to the right of the wall, as viewed in these figures, being within the dark room, while the other portion carrying the copy is outside the dark room. With this arrangement, it is readily possible to manipulate the photosensitive plate without exposing it to light. It will be understood, of course, that any other arrangement of the apparatus may be employed depending upon the requirements in any particular instance.

The manner in which the focusing operation is effected may be clearly understood by reference to Fig. 4. In that figure, the copy is shown at 3a, while the photosensitive plate is shown at 40a. The reflecting devices and the lens are positioned as illustrated. It will be seen that a revertive light path is provided between the copy 3a and the lens 6 by virtue of the reflecting device 5, and a similar revertive light path is provided between the lens 6 and the photosensitive plate 40a by virtue of the reflecting device 28. When the reflecting device 5 is adjusted, both of the light paths extending respectively between the copy 3a and reflector 5 and between reflector 5 and lens 6 are varied, and this enables rapid and accurate adjustment of the focus. It will be noted that the total light path between the copy 3a and the lens 6 is varied more than the change of position of the reflector 5. The same is true of the revertive light path between the lens 6 and the copy 40a. Thus, by employing two adjustable revertive light paths, it is possible to focus the apparatus in any given instance quickly and accurately by adjusting the positions of the reflecting devices through a relatively small range of movement. Moreover, the lens remains stationary and it is unnecessary to move the copy or the lights except to position the copy properly with respect to the reflecting devices.

While the apparatus preferably employs two revertive light paths, as illustrated, it is within the purview of the invention to employ a single revertive light path between the copy and a copying camera. This arrangement, while not as desirable as that shown, is an improvement over prior methods since it eliminates the necessity for moving the copy and the lamps.

Although, a specific form of the apparatus has been illustrated and described, it will be understood that the invention is not thus limited but is capable of various modifications or changes while still adhering to the essential principles.

I claim:

1. A compact copying camera, comprising means for supporting a copy, a lens, means for supporting a photosensitive surface, reflecting means including a light reflector arranged to reflect light from a supported copy revertively to said lens, means for moving said reflector nearer to or farther from the lens along the major axis of the lens, to thereby vary the length of the revertive light path by an amount greater than the adjusting movement of said reflector, reflecting means including a light reflector arranged to reflect light from said lens revertively to said photosensitive surface, and means for moving said last-mentioned reflector nearer to or farther from said lens along the major axis of the lens, to thereby vary the length of the second revertive light path by an amount greater than the adjusting movement of said last-mentioned reflector, whereby focusing of the camera may be effected by relatively small adjustments of said reflectors.

2. A compact copying camera, comprising a housing or casing, means on said housing for supporting a copy, a lens within said housing, means within said housing for supporting a photosensitive surface, a light reflector arranged to reflect light from a supported copy revertively to said lens, a support for said reflector, means for moving said support nearer to or farther from said lens along the major axis of the lens to thereby move said reflector toward or away from the lens, thus varying the length of the revertive light path by an amount greater than the adjusting movement of said reflector, a second light reflector arranged to reflect light from said lens revertively to said photosensitive surface, a support for said second reflector, and means for moving said last-mentioned support nearer to or farther from said lens along the major axis of the lens to thereby move said second reflector toward or away from the lens, thus varying the length of the second revertive light path by an amount greater than the adjusting movement of said second reflector, whereby focusing of the camera may be effected by relatively small adjustments of said reflectors.

3. A compact copying camera, comprising a housing or casing, means on said housing for supporting a copy, a lens within said housing, means within said housing for supporting a photosensitive surface, a light reflector arranged to reflect light from a supported copy revertively to said lens, a screw parallel to the axis of said lens, a support for said reflector threadedly carried by said screw, manually operable means for rotating said screw to thereby move said reflector toward or away from the lens along the major axis of the lens, thus varying the length of the revertive light path by an amount greater than the adjusting movement of said reflector, a second light reflector arranged to reflect light from said lens revertively to said photosensitive surface, a second screw parallel to the axis of said lens, a support for said second reflector threadedly carried by said second screw, and manually operable means for rotating said second screw to thereby move said second reflector toward or away from said lens along the major axis of the lens, thus varying the length of the second revertive light path by an amount greater than the adjusting movement of said second reflector, whereby focusing of the camera may be effected by relatively small adjustments of said reflectors.

LIONEL F. LEVY.